(12) United States Patent
Tsai et al.

(10) Patent No.: US 11,063,428 B2
(45) Date of Patent: Jul. 13, 2021

(54) SWITCH CIRCUIT

(71) Applicant: Chicony Power Technology Co., Ltd., New Taipei (TW)

(72) Inventors: Hsien-Yi Tsai, New Taipei (TW); Yu-Chen Liu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 141 days.

(21) Appl. No.: 16/378,365

(22) Filed: Apr. 8, 2019

(65) Prior Publication Data

US 2020/0161854 A1    May 21, 2020

(30) Foreign Application Priority Data

Nov. 21, 2018   (TW) .................................. 107141555

(51) Int. Cl.
| | | |
|---|---|---|
| *H02H 9/04* | (2006.01) | |
| *H02H 1/00* | (2006.01) | |
| *H02M 3/335* | (2006.01) | |

(52) U.S. Cl.
CPC ............ *H02H 9/04* (2013.01); *H02H 1/0007* (2013.01); *H02M 3/335* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02H 11/002; H02H 1/0023; H02H 1/0007; H02H 1/06; H02H 3/006; H02H 3/165; H02H 3/167; H02H 3/20; H02H 3/30;

(Continued)

(56) References Cited

U.S. PATENT DOCUMENTS 6,683,441 B2   1/2004 Schiff et al.
8,324,870 B1  12/2012 Ramalingam et al.
(Continued)

FOREIGN PATENT DOCUMENTS

CN    102801300 A   11/2012
CN    203180776 U    9/2013
(Continued)

*Primary Examiner* — Bryan R Perez
(74) *Attorney, Agent, or Firm* — Innovation Capital Law Group, LLP; Vic Lin

(57) ABSTRACT

A switch circuit includes a first switch, a current protection component, a current detection circuit, and a controller. The first switch conducts a primary side coil. The current protection component generates a detection voltage. The current detection circuit outputs a protection voltage. When the detection voltage is not greater than a first threshold, the current detection circuit generates a first voltage corresponding to the detection voltage as the protection voltage. When the detection voltage is greater than the first threshold, the current detection circuit generates a second voltage corresponding to the detection voltage as the protection voltage, where the first voltage is different from the second voltage. The controller is suitable for making the first switch selectively conducting and not conducting. When the protection voltage is greater than a second threshold, the controller does not increase a proportion of a conduction time to a non-conduction time of the first switch.

15 Claims, 9 Drawing Sheets

(58) Field of Classification Search
CPC .. H02H 3/08; H02H 3/02; H02H 3/04; H02H 3/06; H02H 3/18; H02H 3/202; H02H 3/243; H02H 3/207; H02H 3/087; H02H 5/042; H02H 7/28; H02H 7/1216; H02H 7/0455; H02H 7/065; H02H 7/1225; H02H 7/1227; H02H 7/125; H02H 7/22; H02H 7/222; H02H 7/20; H02H 7/045; H02H 7/1213; H02H 9/02; H02H 9/04; H02H 9/025
See application file for complete search history.

(56) References Cited

U.S. PATENT DOCUMENTS

| | | |
|---|---|---|
| 2004/0032454 A1 | 2/2004 | Kanda |
| 2011/0305043 A1* | 12/2011 | Matsumoto ....... H02M 3/33592 363/21.01 |
| 2014/0218978 A1 | 8/2014 | Heuken et al. |
| 2016/0323949 A1 | 11/2016 | Lee |
| 2017/0317593 A1* | 11/2017 | Huang .............. H02M 3/33507 |
| 2018/0062383 A1 | 3/2018 | Kawashima |

FOREIGN PATENT DOCUMENTS

| | | |
|---|---|---|
| CN | 104022650 A | 9/2014 |
| CN | 106129968 A | 11/2016 |
| JP | 2015116031 A | 6/2015 |
| TW | 201032454 A | 9/2010 |
| TW | 201421878 A | 6/2014 |
| TW | M496290 U | 2/2015 |
| TW | 201545448 A | 12/2015 |
| TW | M513512 U | 12/2015 |
| TW | 201630291 A | 8/2016 |
| TW | 1565212 B | 1/2017 |

* cited by examiner

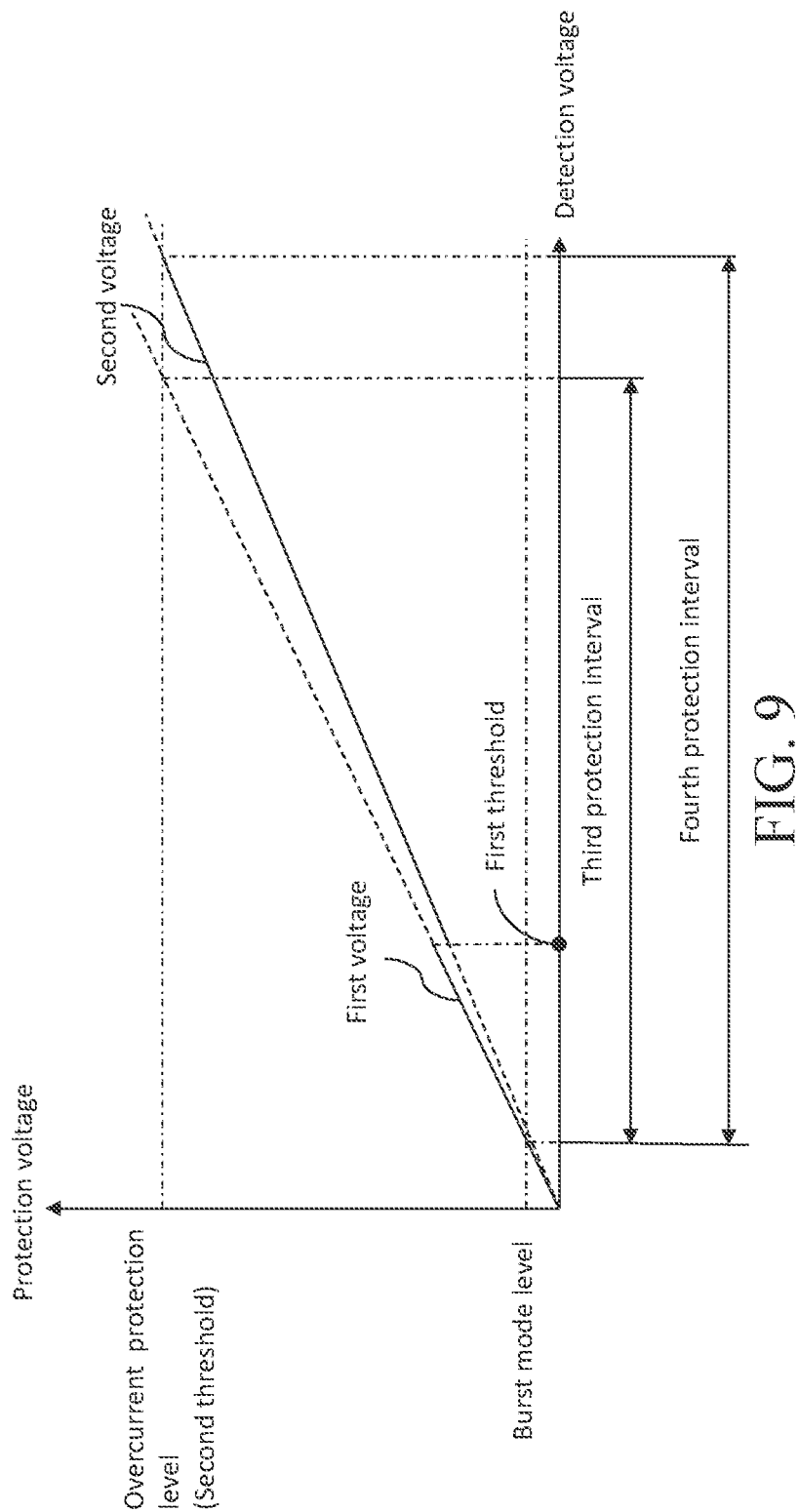

SWITCH CIRCUIT

CROSS-REFERENCE TO RELATED APPLICATION

This non-provisional application claims priority under 35 U.S.C. § 119(a) to Patent Application No. 107141555 filed in Taiwan, R.O.C. on Nov. 21, 2018, the entire contents of which are hereby incorporated by reference.

BACKGROUND

Technical Field

This disclosure relates to a switch circuit, and in particular, to a switch circuit suitable for a power device having a primary side coil.

Related Art

At present, a controller of a power supply typically includes a mechanism of current protection or power protection, to avoid disability or even burning of the power supply caused by continuously outputting an overcurrent which exceeds a rated power of the power supply.

Taking a power supply having current protection as an example, the current limit of the power supply cannot be adjusted in response to different load conditions. That is, a general power supply cannot adaptively adjust the current protection interval based on different load conditions and operation statuses, to meet particular load requirements.

SUMMARY

In view of the foregoing problem, according to some embodiment, a switch circuit is suitable for a power device having a primary side coil. The switch circuit includes a first switch, a current protection component, a current detection circuit, and a controller. The first switch is configured to conduct and not conduct the primary side coil. When the first switch conducts the primary side coil, the current protection component generates a detection voltage corresponding to a current passing through the first switch. The current detection circuit is connected in parallel to the current protection component and outputs a protection voltage. When the detection voltage is not greater than a first threshold, the current detection circuit generates a first voltage corresponding to the detection voltage as the protection voltage. When the detection voltage is greater than the first threshold, the current detection circuit generates a second voltage corresponding to the detection voltage as the protection voltage. The first voltage is different from the second voltage. The controller is configured to make the first switch selectively conducting and not conducting. When the protection voltage is greater than a second threshold, the controller does not increase a proportion of a conduction time to a non-conduction time of the first switch.

According to some embodiments, when the detection voltage is not greater than the first threshold, the first voltage generated by the current detection circuit is the detection voltage.

According to some embodiments, the current detection circuit includes: a first impedance, a second impedance, and a second switch sequentially connected in series. One end of the first impedance is electrically connected to a first node connected to the first switch and the current protection component. The other end of the first impedance outputs the protection voltage. The second switch is conducting when the detection voltage is greater than the first threshold. The second switch is not conducting when the detection voltage is not greater than the first threshold.

According to some embodiments, the first impedance has a first end and a second end. The first end of the first impedance is electrically connected to the first node. The second impedance has a first end and a second end. The first end of the second impedance is electrically connected to a second node connected to the second end of the first impedance. The second switch has a control point and a gate point. The control point is electrically connected to the first node and the gate point is electrically connected to the second node.

According to some embodiments, the current detection circuit includes a comparison circuit electrically connected to the current protection component and the second switch. The comparison circuit compares the detection voltage and a reference voltage, and outputs a comparison voltage. The second switch is conducting when the comparison voltage is greater than the first threshold. The second switch is not conducting when the comparison voltage is not greater than the first threshold.

According to some embodiments, the current detection circuit includes a gain circuit electrically connected to the current protection component and the second switch. The gain circuit alters the detection voltage and outputs a gain voltage. The second switch is conducting when the gain voltage is greater than the first threshold. The second switch is not conducting when the gain voltage is not greater than the first threshold.

According to some embodiments, the current detection circuit includes a first impedance, a second impedance, and a second switch sequentially connected in series, and a third impedance connected in parallel to series-connected the second impedance and the second switch. One end of the first impedance is electrically connected to a first node connected to the first switch and the current protection component. When the detection voltage is greater than the first threshold, the second switch is conducting, and the other end of the first impedance outputs the protection voltage. When the detection voltage is not greater than the first threshold, the second switch is not conducting, and the other end of the first impedance outputs the protection voltage.

According to some embodiments, the first impedance has a first end and a second end. The first end of the first impedance is electrically connected to the first node. The second end of the first impedance is electrically connected to a second node. The second impedance has a first end and a second end. The first end of the second impedance is electrically connected to the second node. The third impedance has a first end and a second end. The first end of the third impedance is electrically connected to the second node. The second switch has a control point and a gate point. The control point is electrically connected to the first node and the gate point is electrically connected to the second end of the second impedance.

According to some embodiments, the current protection component is a resistor, a Hall component, or a current transformer.

According to some embodiments, the controller makes the first switch not conducting when the protection voltage is greater than the second threshold.

According to some embodiments, the first switch and the second switch are semiconductor switches.

According to some embodiments, the first switch is a field effect transistor and the second switch is a bipolar transistor.

According to some embodiments, the switch circuit is suitable for a power device having a primary side coil, and is capable of adjusting a current protection interval of the power device.

BRIEF DESCRIPTION OF THE DRAWINGS

FIG. 9 illustrates a schematic diagram showing relationship between protection voltages and detection voltages of the switch circuit in FIG. 3.

DETAILED DESCRIPTION

Figure 1:
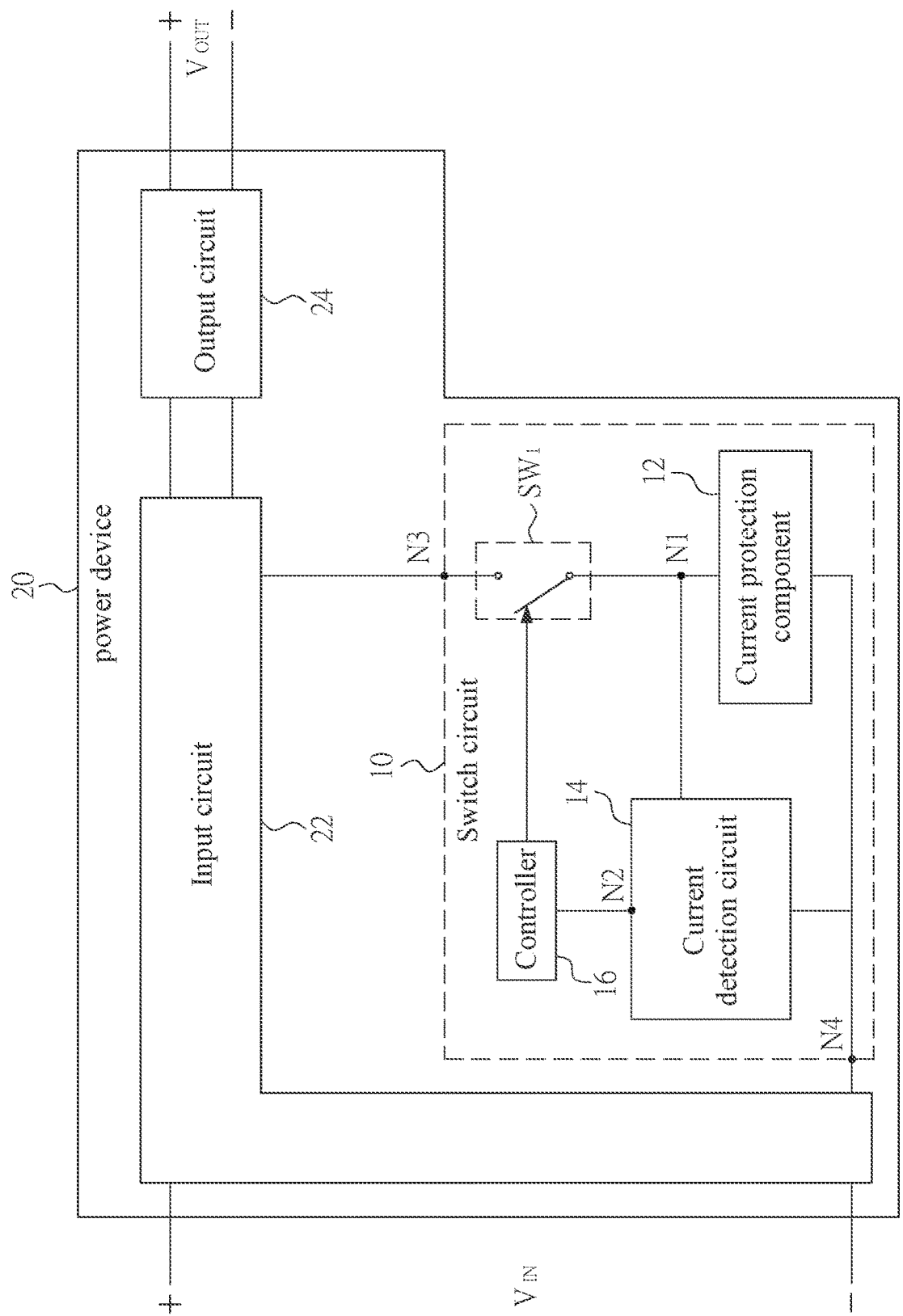
FIG. 1 illustrates a schematic function block diagram of a switch circuit, according to a first embodiment, applied in a power device.

Referring to FIG. 1, FIG. 1 illustrates a schematic function block diagram of a switch circuit 10, according to a first embodiment, applied in a power device 20. The power device 20 includes an input circuit 22, an output circuit 24, and the switch circuit 10. The input circuit 22 is electrically connected to the switch circuit 10 and the output circuit 24. The power device 20 is, for example, but not limited to, a linear power supply or a switching power supply. The switching power supply is, for example, but not limited to, a flyback converter, a forward converter, a boost converter, or other converters.

The power device 20 includes at least two input ends and at least two output ends. The two input ends are electrically connected to the input circuit 22 to receive an input power, such as an input voltage $V_{IN}$. The two output ends are electrically connected to the output circuit 24, to output an output power, such as an output voltage $V_{OUT}$. The input power may be, but not limited to, an alternating-current (AC) power, and the output power may be, but not limited to a direct-current (DC) power.

The input circuit 22 may be, but not limited to, a transformer having a primary side coil, such as a two-winding transformer (see FIG. 2) having a primary side coil $L_1$, a three-winding transformer (see FIG. 6) having primary side coils $L_1$ and $L_1'$, or an inductor $L_1''$ (see FIG. 7) electrically connected to a first switch $SW_1$.

The switch circuit 10 is suitable for a power device 20 having a primary side coil $L_1$, to adjust a current protection interval of the power device 20. The switch circuit 10 includes a first switch $SW_1$, a current protection component 12, a current detection circuit 14, and a controller 16.

The first switch $SW_1$ may be, but not limited to, a semiconductor switch, such as a field effect transistor or a bipolar transistor. The first switch $SW_1$ is electrically connected to the primary side coils $L_1$, or $L_1''$, the current protection component 12, and the controller 16. The first switch $SW_1$ is controlled by the controller 16 to conduct and not to conduct the primary side coils $L_1$, or $L_1''$. The term "to conduct" means that the switch circuit 10 electrically connects the input circuit 22 with the current protection component 12 to form a closed current loop among the input circuit 22, the switch circuit 10 and the current protection component 12. On the contrary, the term "not to conduct" means that the switch circuit 10 does not electrically connect the input circuit 22 with the current protection component 12 and the current loop among the input circuit 22, the switch circuit 10 and the current protection component 12 is opened.

The current protection component 12 may be, but not limited to, a resistor R (see FIG. 2), a Hall component, or a current transformer. The current protection component 12 is connected in parallel to the current detection circuit 14. When the first switch $SW_1$ is conducting, a detection voltage corresponding to a current passing through the first switch $SW_1$ is generated. That is, when the switch circuit 10, the current protection component 12 and the input circuit 22 form a closed current loop, the input voltage $V_{IN}$ is applied to the first switch $SW_1$, the current protection component 12, the current detection circuit 14, and the controller 16, then a current is generated at the first switch $SW_1$. Next, the current is shunted at the current protection component 12 and the current detection circuit 14, so that the current protection component 12 generates a detection voltage at a first node N1 and the current detection circuit 14 generates a protection voltage at a second node N2.

The current detection circuit 14 is connected in parallel to the current protection component 12 and outputs the protection voltage to the controller 16. When the detection voltage is not greater than a first threshold, the current detection circuit 14 generates a first voltage corresponding to the detection voltage as the protection voltage. When the detection voltage is greater than the first threshold, the current detection circuit 14 generates a second voltage corresponding to the detection voltage as the protection voltage, where the first voltage is different from the second voltage. The term "first threshold" means that the current detection circuit 14 has a threshold voltage, and the current detection circuit 14 may selectively output the first voltage and the second voltage according to whether the detection voltage is greater than the threshold voltage. Details are described later. The term "corresponding to" means that the first voltage is in a proportional relationship with the detection voltage. In some embodiments, the first voltage is equal to the detection voltage. In some other embodiments, the first voltage is equal to the detection voltage multiplied by a constant proportion. In some embodiments, the constant proportion is an impedance (or voltage division) ratio of two resistors connected in series.

The controller 16 is electrically connected to the first switch $SW_1$ and the current detection circuit 14, and controls the first switch $SW_1$ to selectively conduct or not to conduct in response to the protection voltage. The controller 16 is, for example, but not limited to, a pulse width modulation (PWM) controller. The PWM controller can modulate an analog signal into a pulse whose duty cycle or frequency may be adjusted. In some embodiments, the PWM controller outputs the pulse in the form of rectangular waveforms and is capable of adjusting the duty cycle. The duty cycle is the ratio between the pulse duration (or called as pulse width) and the single period of a rectangular waveform. The single period of a rectangular waveform is also called as a single working cycle. When the protection voltage is greater than a second threshold, the controller 16 does not increase a proportion of a conduction time to a non-conduction time of the first switch $SW_1$. The term "second threshold" refers to a protection voltage when a current of a power supply has reached an activation threshold of an overcurrent protection mode. For example, the protection voltage is 1 volt when the power supply reaches the activation threshold of the overcurrent protection mode. When the protection voltage is greater than 1 volt, the controller 16 may change the proportion of the conduction time to the non-conduction time of the first switch $SW_1$ based on settings, and the controller 16 controls the first switch $SW_1$ not to conduct (that is, the current loop is opened and the power supply does not supply power). Alternatively, when the protection voltage is greater than 1 volt, the controller 16 controls the first switch $SW_1$ not to conduct until the protection voltage is not greater than 1 volt (that is, the current of the power supply decreases gradually). When the protection voltage is not greater than 1 volt, the controller 16 may adjust a proportion of the conduction time of the first switch $SW_1$ in a single working cycle. That is, the controller 16 may change the proportion of the conduction time in a working cycle through conducting and not conducting the first switch $SW_1$. The controller 16, by doing so, controls the current of the power supply at a default current value that does not activate the overcurrent protection mode, or may cease the current of the power supply. A commonly adopted operation is: during a working cycle in which the first switch $SW_1$ is conducting and not conducting, the moment the protection voltage reaches the second threshold (for example, the aforementioned 1 volt), the controller 16 immediately makes the first switch $SW_1$ not conducting, and the controller 16 does not make the first switch $SW_1$ conducting again until a new working cycle starts next. A working period includes a periodic signal composed of a first half cycle and a second half cycle. For example, the periodic signal having a first half cycle and a second half cycle is, but not limited to, a square wave, a pulse wave, a sine wave, a triangle wave, or a sawtooth wave.

Further, when the first switch $SW_1$ is conducting, the input voltage $V_{IN}$ is supplied to the primary side coil $L_1$ through the two input ends so that the primary side coil $L_1$ generates a first signal of a first half cycle, and a secondary side coil $L_2$ (see FIG. 2) generates a second signal of the first half cycle by being induced by the first signal of the first half cycle. A voltage ratio of the first signal of the first half cycle to the second signal of the first half cycle is equal to a turn ratio of the primary side coil $L_1$ to the secondary side coil $L_2$. Next, the output circuit 24 changes the second signal of the first half cycle and outputs an output voltage $V_{OUT}$ through the two output ends. In some embodiment, the output circuit 24 rectifies and/or filters the second signal of the first half cycle and outputs the output voltage $V_{OUT}$. By contrast, when the first switch $SW_1$ is not conducting, the input voltage $V_{IN}$ does not be supplied to the primary side coil $L_1$. Consequently, the primary coil $L_1$ generates a first signal of a second half cycle by inductive reactance and the secondary side coil $L_2$ generate a second signal of the second half cycle corresponding to the first signal of the second half cycle. Next, the output circuit 24 changes the second signal of the second half cycle and outputs the output voltage $V_{OUT}$. Therefore, when the controller 16 controls the first switch $SW_1$ to be alternately conducting and not conducting, the output circuit 24 outputs the output voltage $V_{OUT}$ in a default working cycle, where the output voltage $V_{OUT}$ may be selectively changed with adjustment of each second signal of the first half cycle and each second signal of the second half cycle following each second signal of the first half cycle. The input voltage $V_{IN}$ is, for example, but not limited to, an AC power, and the output voltage $V_{OUT}$ is, for example, but not limited to, a DC power.

Figure 2:
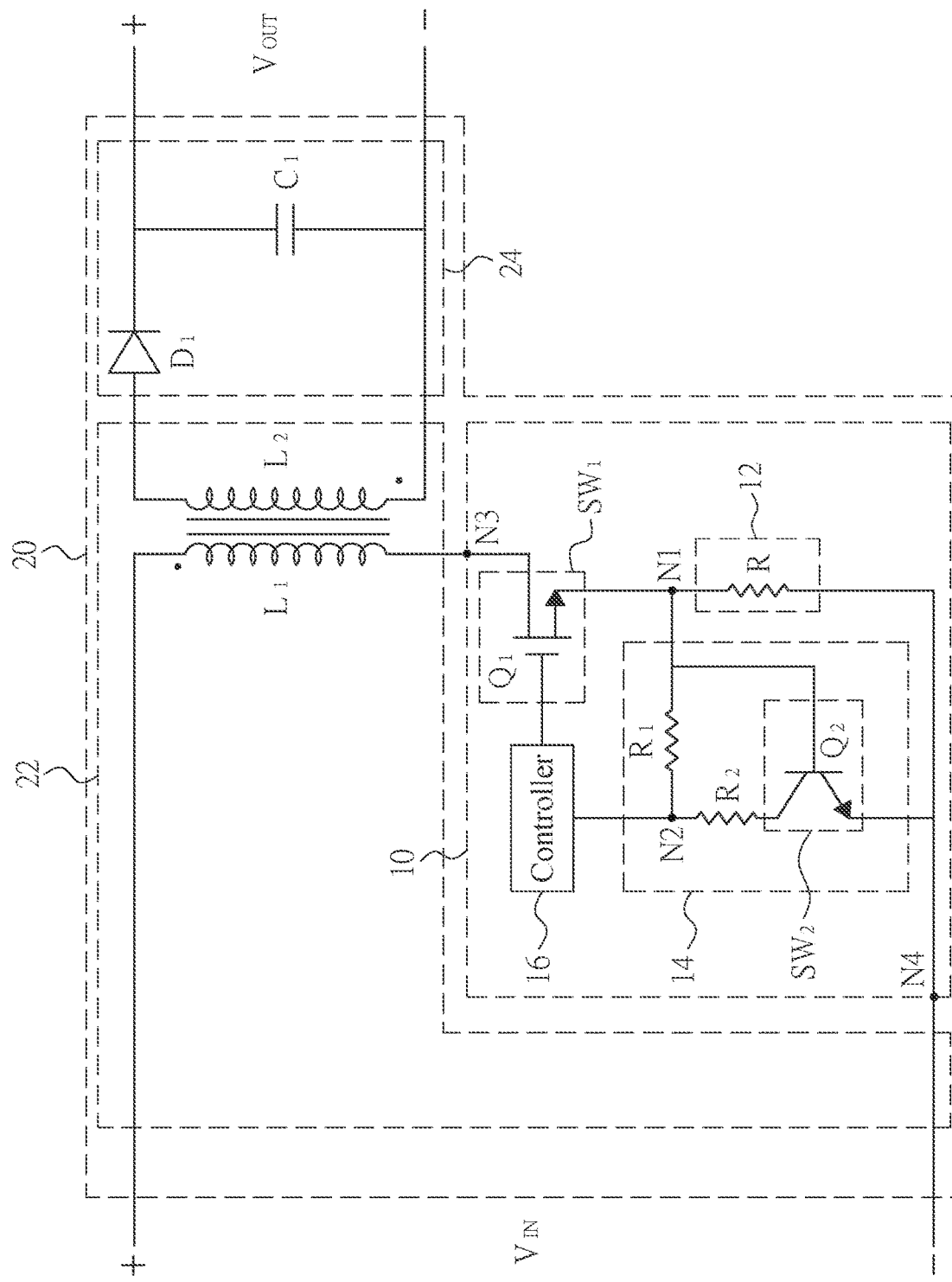
FIG. 2 illustrates a schematic function block diagram of the switch circuit applied in the power device in FIG. 1.

Referring to FIG. 1 and FIG. 2, FIG. 2 illustrates a schematic function block diagram of a switch circuit 10 applied in the power device 20 in FIG. 1. In the embodiment of FIG. 2, the power device 20 is a switching power supply having a flyback converter. The input circuit 22 may be, but not limited to, a two-winding transformer. The output circuit 24 may be, but not limited to, a rectifier circuit or a filter circuit. In some embodiment, the output circuit 24 is a half-wave rectifying and filtering circuit which comprises a diode $D_1$ and a capacitor $C_1$. The two-winding transformer has at least one primary side coil $L_1$ and one secondary side coil $L_2$. One end of the primary side coil $L_1$ is electrically connected to an input end and the other end is electrically connected to the first switch $SW_1$ of the switch circuit 10. The switch circuit 10 is then connected to the other input end. One end of the secondary side coil $L_2$ is electrically connected to an anode of the diode $D_1$ and the other end is electrically connected to one end of the capacitor $C_1$. A cathode of the diode $D_1$ is electrically connected to the other end of the capacitor $C_1$. Two ends of the capacitor $C_1$ are respectively electrically connected to the two output ends. According to some embodiments, the input circuit 22 further includes a rectifier circuit, electrically connected to the primary side coil $L_1$ of the transformer. The rectifier circuit is, for example, but not limited to, a bridge rectifier circuit.

The first switch $SW_1$ and the current protection component 12 have been seen in the foregoing related paragraphs, and details are not described again.

The current detection circuit 14 includes a first impedance, a second impedance, and a second switch $SW_2$ sequentially connected in series. The first impedance and the second impedance are, for example, but not limited to, a resistor, an inductor, a capacitor, or a combination of a resistor, an inductor, and a capacitor. For example, the first impedance and the second impedance are, as shown on FIG. 2, a first resistor $R_1$ and a second resistor $R_2$ respectively. One end of the first resistor $R_1$ is electrically connected to the first node N1 which is the node connected to the first switch $SW_1$ and the current protection component 12. The other end of the first resistor $R_1$ connected with the second resistor $R_2$ is the second node N2 which outputs the protection voltage. The first switch $SW_1$ is connected to a third node N3 which is one of two ends of the primary side coil $L_1$, the controller 16, and the first node N1. The second switch $SW_2$ is conducting when the detection voltage is greater than the first threshold. The second switch $SW_2$ is not conducting when the detection voltage is not greater than the first threshold.

Further, the first resistor $R_1$ has a first end and a second end, and the first end of the first resistor $R_1$ is electrically connected to the first node N1.

Further, the second resistor $R_2$ has a first end and a second end. The first end of the second resistor $R_2$ is electrically connected to the second end of the first resistor $R_1$.

Further, the second switch $SW_2$ has a control point and a gate point, the control point is electrically connected to the first end of the first resistor $R_1$, and the gate point is electrically connected to the second end of the second resistor $R_2$. The second switch $SW_2$ is, for example, but not limited to, the semiconductor switch. Using the bipolar transistor $Q_2$ as an example, the bipolar transistor $Q_2$ has a base (that is, a control point), a collector (that is, a gate point), and an emitter (a grounded point, connected to a fourth node N4 shown in FIG. 2). When a detection voltage between the base and the emitter is greater than a threshold voltage (that is, the first threshold) of the bipolar transistor $Q_2$, the bipolar transistor $Q_2$ is conducting to make the first resistor $R_1$ and the second resistor $R_2$ to divide the detection voltage to generate the second voltage at the second node N2. In this embodiment, the protection voltage is the sum of the voltage difference between two ends of the second resistor $R_2$ and the voltage difference between the collector and the emitter of the bipolar transistor $Q_2$. In this case, the second voltage is the protection voltage. By contrast, when the detection voltage (i.e., the voltage at the first node N1) between the base and the emitter is not greater than the threshold voltage of the bipolar transistor $Q_2$, the bipolar transistor $Q_2$ is not conducting, so that the detection voltage generated by the current protection component 12 is directly used as the protection voltage which means the first voltage is the detection voltage.

Figure 8:
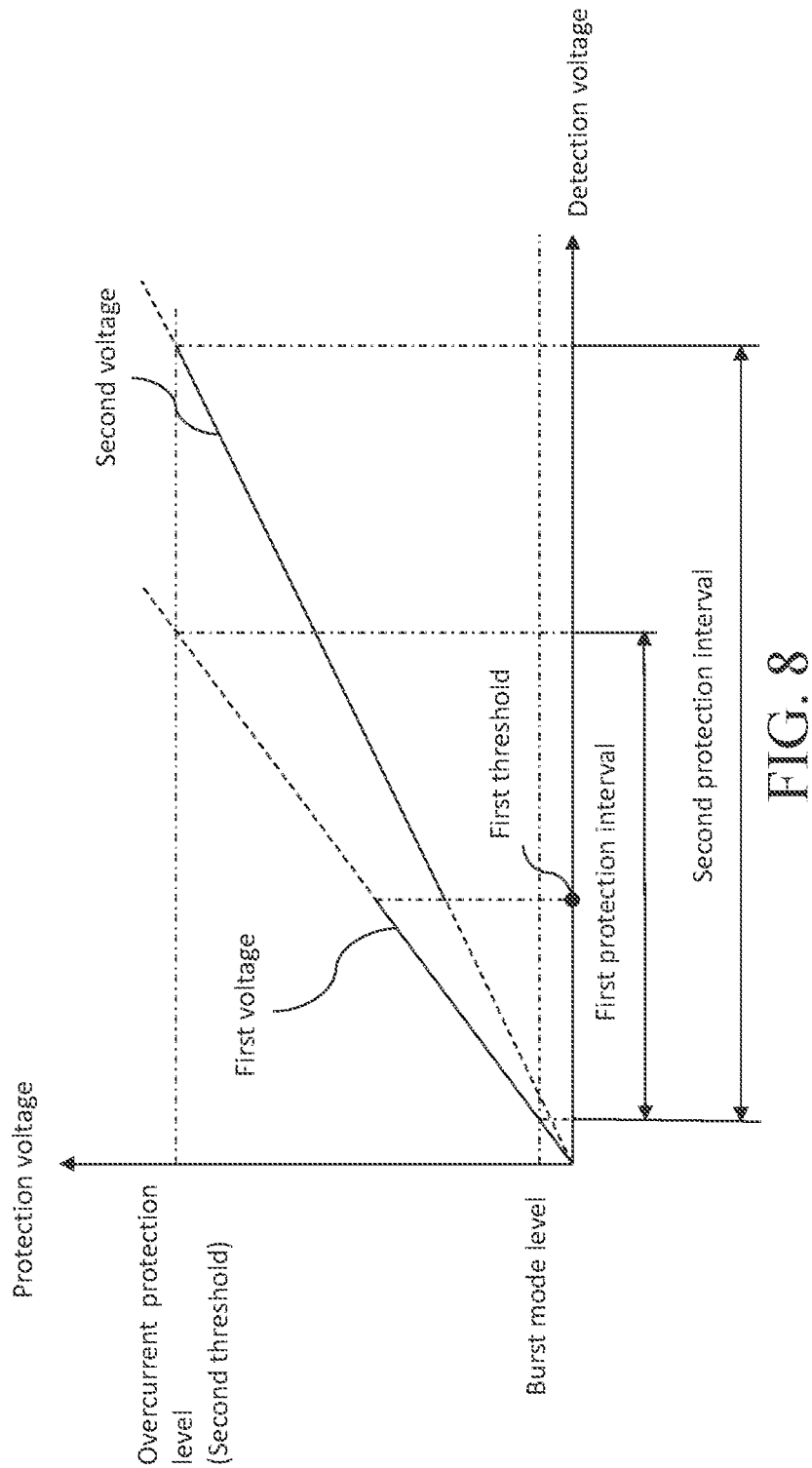
FIG. 8 illustrates a schematic diagram showing relationship between protection voltages and detection voltages of the switch circuit in FIG. 2.

Referring to FIG. 2 and FIG. 8, FIG. 8 illustrates a schematic function block diagram showing relationship between protection voltages and detection voltages of the switch circuit 10 in FIG. 2. The horizontal axis is the detection voltage while the vertical axis is the protection voltage. The solid line on the diagram of FIG. 8 shows that the protection voltage changes in accordance with the detection voltage. As described above, the protection voltage is the first voltage when the detection voltage is not greater than the first threshold, and the protection voltage is the second voltage when the detection voltage is greater than the first threshold. The solid line which the detection voltage is not greater than the first threshold is the first voltage. The solid line which the detection voltage is greater than the first threshold is the second voltage. Therefore, the change rate of the first voltage is 1, the slope of the solid line representing the first voltage. The change rate of the second voltage is $R_2/(R_1+R_2)<1$, the slope of the solid line representing the second voltage. As shown on the vertical axis, the overcurrent protection level is greater than the burst mode level. When the protection voltage is lower than the burst mode level, the controller 16 controls the power device 20 to be operated in a burst mode. When the protection voltage is higher than the overcurrent protection level, the controller 16 controls the power device 20 to be operated in the overcurrent protection mode, so that the current passing through the primary side coil $L_1$ would not exceed a preset upper limit. The overcurrent protection level is the second threshold described in the foregoing paragraph.

When the detection voltage is not greater than the first threshold, the second switch $SW_2$ is not conducting. Therefore, the protection voltage is equal to the detection voltage and the slope of the first voltage is 1. When the detection voltage is greater than the first threshold, the second switch $SW_2$ is conducting. Therefore, the protection voltage is the detection voltage multiplied by $R_2/(R_1+R_2)$ and the slope of the second voltage is less than 1. In general, when the protection voltage is higher than the overcurrent protection level, the controller 16 controls the power device 20 being operated in the overcurrent protection mode. In the case that if the switch circuit 10 is functionally not equipped with the current detection circuit 14 and the first node N1 provides the detection voltage to the controller 16, the detection circuit 14 will only provide the first voltage to the controller 16. The controller 16 would control the power device 20 being operated in the overcurrent protection mode when the first voltage (the protection voltage is the detection voltage) is greater than the overcurrent protection level (see the dotted line of the first voltage in FIG. 8). The power device 20 would be operated according to the first protection interval as shown in FIG. 8. However, in the embodiment of FIG. 2, the controller 16 controls the power device 20 being operated in the overcurrent protection mode when the second voltage is greater than the overcurrent protection level (see the solid line of the second voltage in FIG. 8). The power device 20 is operated according to the second protection interval as shown in FIG. 8. In other words, by way of the current detection circuit 14, the switch circuit 10 with the same controller 16 adjusts the first protection interval to the second protection interval.

Figure 3:
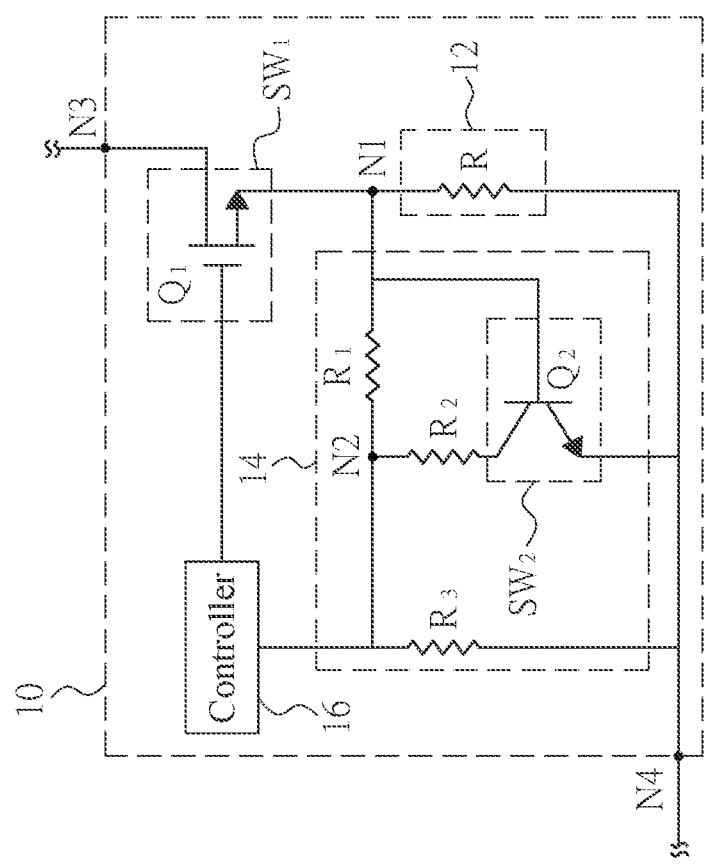
FIG. 3 illustrates a schematic function block diagram of a switch circuit according to a second embodiment.

Referring to FIG. 1 and FIG. 3, FIG. 3 illustrates a schematic function block diagram of a switch circuit 10 according to a second embodiment. According to some embodiments, the current detection circuit 14 includes a first impedance, a second impedance, a third impedance, and a second switch $SW_2$. The first impedance, the second impedance and the second switch $SW_2$ are connected in series. The third impedance connected in parallel to series-connected the second impedance and the second switch $SW_2$ as shown in FIG. 3. The first impedance, the second impedance, and the second switch $SW_2$ have been seen in the foregoing related paragraphs, and details are not described again. The third impedance is, for example, but not limited to, a resistor, an inductor, or a capacitor, or a combination of a resistor, an inductor, and a capacitor. For example, the first impedance, the second impedance, and the third impedance are a first resistor $R_1$, a second resistor $R_2$, and a third resistor $R_3$ respectively. The first switch $SW_1$, as shown in FIG. 3, is connected to the third node N3, the controller 16 and the first node N1. The third resistor $R_3$ is connected between the fourth node N4 and the second node N2. Specifically, the third resistor $R_3$ is connected in parallel to series-connected the second resistor $R_2$ and the second switch $SW_2$ as shown in FIG. 3.

One end of the first resistor $R_1$ is electrically connected to the first node N1 connected to the first switch $SW_1$ and the current protection component 12. When the detection voltage is greater than the first threshold, the second switch $SW_2$ is conducting and the second node N2 outputs a protection voltage. When the detection voltage is not greater than the first threshold, the second switch $SW_2$ is not conducting and the second node N2 outputs a protection voltage which differs from the aforementioned protection voltage and the detection voltage. The second switch $SW_2$, for example, but not limited to, the semiconductor switch. In some embodiments, the second switch $SW_2$ is a bipolar transistor $Q_2$. In the embodiment of FIG. 3, when the voltage difference of two ends of the current protection component 12 (i.e., the detection voltage) is greater than the first threshold (i.e., the threshold voltage of the bipolar transistor $Q_2$), the bipolar transistor $Q_2$ is conducting. While the bipolar transistor $Q_2$ is conducting, the second node N2 outputs the protection voltage which is the detection voltage multiplied by $(R_2/R_3)/(R_1+(R_2/R_3))$. In contrast, when the detection voltage is not greater than the first threshold (i.e., the threshold voltage of the bipolar transistor $Q_2$), the bipolar transistor $Q_2$ is not conducting. The second node N2 outputs the protection voltage which is the detection voltage multiplied by $R_3/(R_1+R_3)$.

Further, the first resistor $R_1$ has a first end and a second end. The first end and the second end of the first resistor $R_1$ are electrically connected to the first node N1 and the second node N2, respectively.

Further, the second resistor $R_2$ has a first end and a second end, and the first end of the second resistor $R_2$ is electrically connected to the second node N2.

Further, the third resistor $R_3$ has a first end and a second end. The first end and the second end of the third resistor $R_3$ are electrically connected to the second node N2 and the fourth node N4, respectively.

Further, the second switch $SW_2$ has a control point and a gate point, the control point is electrically connected to the first node N1, and the gate point is electrically connected to the second end of the second resistor $R_2$.

Referring to FIG. 3 and FIG. 9, FIG. 9 illustrates a schematic diagram showing relationship between protection voltages and detection voltages of the switch circuit 10 in FIG. 3. The horizontal axis represents the detection voltage while the vertical axis represents the protection voltage. The protection voltage is the first voltage when the detection voltage is not greater than the first threshold, and the protection voltage is the second voltage when the detection voltage is greater than the first threshold. The change rate of the first voltage is $R_3/(R_1+R_3)$, the slope of solid line representing the first voltage. The change rate of the second voltage is $(R_2//R_3)/(R_1+(R_2//R_3))$, the slope of solid line representing the second voltage. Similarly to diagram of FIG. 8, the switch circuit 10 of FIG. 3 makes the power device 20 be operated according to the fourth protection interval as shown on FIG. 9.

When the detection voltage is not greater than the first threshold, the second switch $SW_2$ is not conducting. Therefore, the protection voltage is the detection voltage multiplied by $R_3/(R_1+R_3)$ which is less than 1. When the detection voltage is greater than the first threshold, the second switch $SW_2$ is conducting. Therefore, the protection voltage is the detection voltage multiplied by $(R_2//R_3)/(R_1+(R_2//R_3))$ which is less than $R_3/(R_1+R_3)$. When the switch circuit 10 is implemented, the values of the first resistor $R_1$, the second resistor $R_2$ and the third resistor $R_3$ can be adjusted to decide the slopes of the first voltage and the second voltage. Consequently, the user who adopts the switch circuit 10 can use the same controller 16 to provide different protection intervals to meet different requirements for the power device 20.

In addition, when the second switch $SW_2$ is not conducting, the protection voltage is the detection voltage multiplied by $R_3/(R_1+R_3)$, which is the first voltage. Therefore, the detection voltage corresponding to the burst mode level in the embodiment of FIG. 3 is higher than the detection voltage corresponding to the burst mode level in the embodiment of FIG. 2. That is, by adding the third resistor $R_3$, a detection voltage triggering the burst mode of the power device 20 can be adjusted (see FIG. 9). The foregoing terms "change rate of the first voltage" and "change rate of the second voltage" are merely descriptions with reference to drawings. The values or ratios of the resistances and the connection manners of the first resistor $R_1$, the second resistor $R_2$, and/or the third resistor $R_3$ are for exemplary purposes, but not to limit the scope of the switch circuit to the embodiments.

Figure 4:
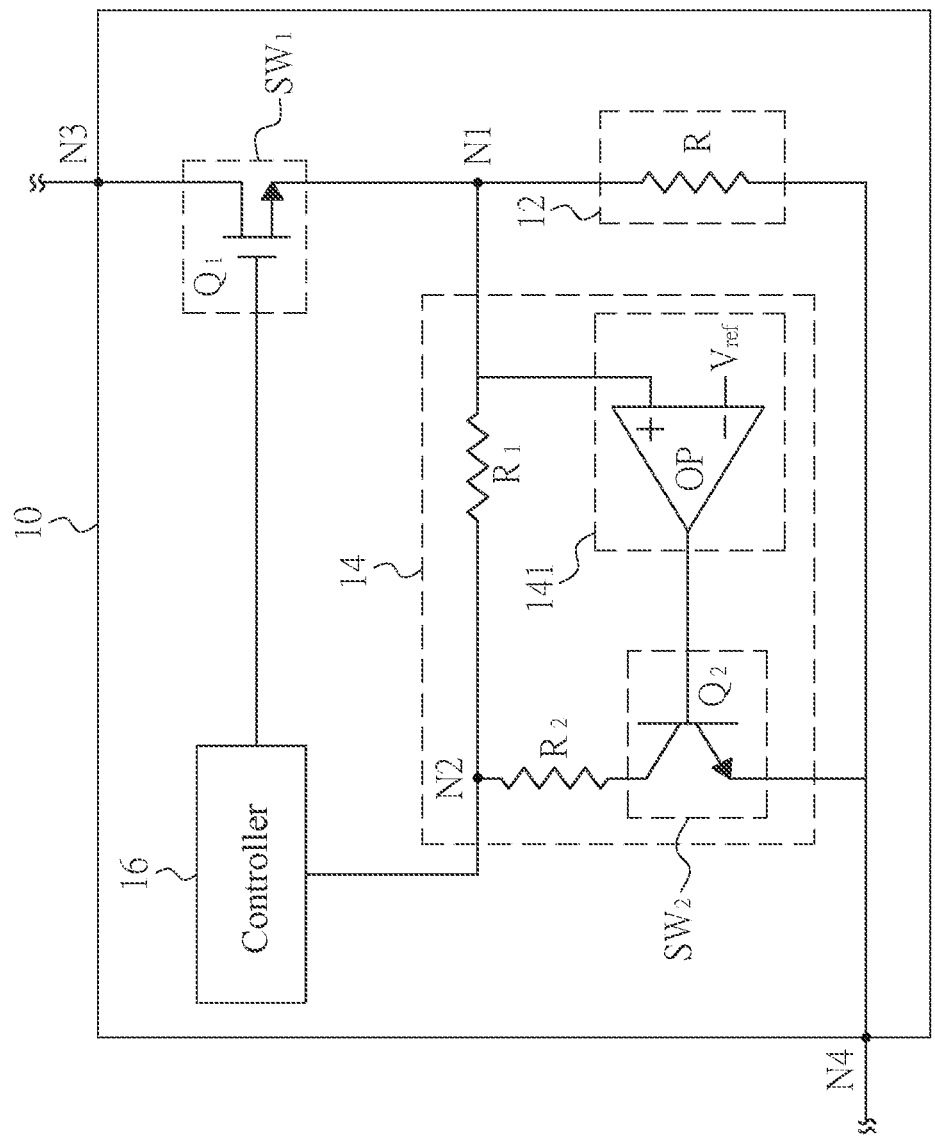
FIG. 4 illustrates a schematic function block diagram of a switch circuit according to a third embodiment.

Referring to FIG. 1 and FIG. 4, FIG. 4 illustrates a schematic function block diagram of a switch circuit 10 according to a third embodiment. According to some embodiments, the current detection circuit 14 includes a first impedance, a second impedance, a second switch $SW_2$, and a comparison circuit 141. The first impedance, the second impedance, and the second switch $SW_2$ have been seen in the foregoing related paragraphs, and details are not described again. The comparison circuit 141 is, for example, but not limited to, a comparator, such as an operational amplifier OP. In some embodiment, the comparison circuit 141 is a LM339 comparator.

In the embodiment of FIG. 4, a non-inverting input node of the comparison circuit 141 electrically connects to the first node N1. An inverting input node of the comparison circuit 141 is connected to a reference voltage $V_{ref}$. An output node of the comparison circuit 141 is connected to the control point of the second switch $SW_2$. The comparison circuit 141 compares the detection voltage and the reference voltage $V_{ref}$, and outputs a comparison voltage. The second switch $SW_2$ is conducting when the comparison voltage is greater than a first threshold. The second switch $SW_2$ is not conducting when the comparison voltage is not greater than the first threshold. For example, when the detection voltage is greater than the reference voltage $V_{ref}$, the comparison voltage outputted by the comparison circuit 141 is a positive saturation voltage of the comparison circuit 141. The positive saturation voltage is designed, in the embodiment, to be greater than a threshold voltage (referred to as "first threshold") of the second switch $SW_2$, so that the second switch $SW_2$ is conducting. In contrast, when the detection voltage is not greater than the reference voltage $V_{ref}$, the comparison voltage outputted by the comparison circuit 141 is a negative saturation voltage of the comparison circuit 141. The negative saturation voltage is designed, in the embodiment, to be less than the threshold voltage of the second switch $SW_2$, so that the second switch $SW_2$ is not conducting. When the second switch $SW_2$ is not conducting, the detection voltage (i.e., the first voltage) is used as the protection voltage.

Figure 5:
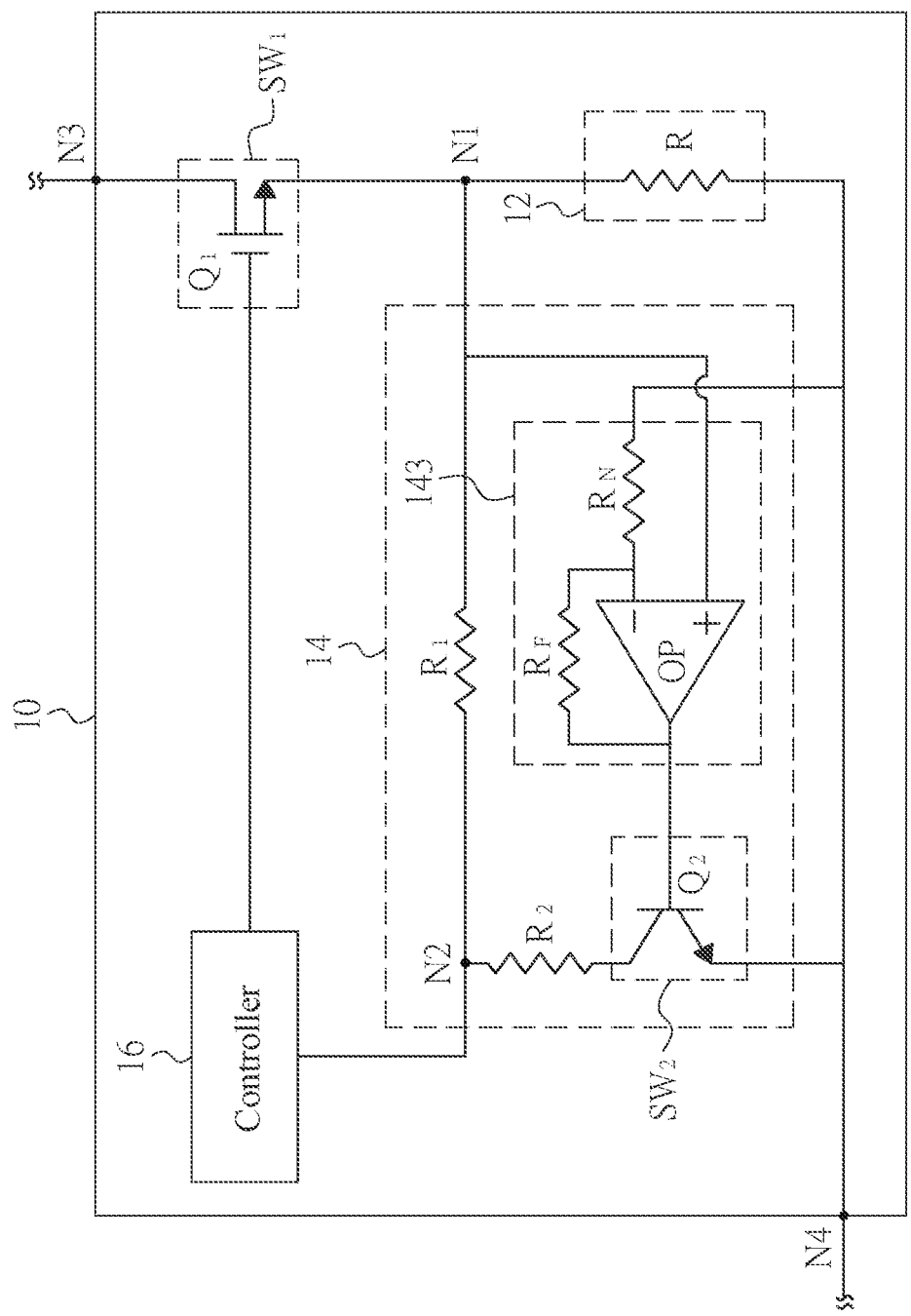
FIG. 5 illustrates a schematic function block diagram of a switch circuit according to a forth embodiment.

Referring to FIG. 1 and FIG. 5, FIG. 5 illustrates a schematic function block diagram of a switch circuit 10 according to a fourth embodiment. According to some embodiments, the current detection circuit 14 includes a first impedance, a second impedance, a second switch $SW_2$, and a gain circuit 143. The first impedance, the second impedance, and the second switch $SW_2$ have been seen in the foregoing related paragraphs, and details are not described again. The gain circuit 143 is for example, but not limited to, a feedback amplifier circuit, or a gain circuit formed by a field effect transistor (or a bipolar transistor), a resistor, a capacitor, and an inductor.

The gain circuit 143 electrically connects the current protection component 12 and the second switch $SW_2$. The gain circuit 143 typically amplifies the detection voltage with a gain value that is greater than 1, and outputs a gain voltage. In other embodiments, the gain circuit 143 may transfer or attenuate the detection voltage with a gain value that is equal to or less than 1, and outputs the gain voltage. The second switch $SW_2$ is conducting when the gain voltage is greater than the first threshold. The second switch $SW_2$ is not conducting when the gain voltage is not greater than the first threshold. In the embodiment of FIG. 5, the gain circuit 143 includes an operational amplifier OP, an input resistor $R_N$, and a feedback resistor $R_F$. A non-inverting input node of the operational amplifier OP is electrically connected to the first node N1. An output node of the operational amplifier OP is electrically connected to the control point of the second switch $SW_2$. The input resistor $R_N$ is connected between an inverting input of the operational amplifier OP and the fourth node N4. The feedback resistor $R_F$ is connected between the output node and the inverting input node of the operational amplifier OP. In some embodiment, the fourth node N4 is grounded and $R_F=R_N$. The operational amplifier OP outputs the gain voltage which is twice as much as the detection voltage. The gain voltage is to conduct or not to conduct the second switch $SW_2$. The ratio of the gain voltage to the detection voltage can be, but not limited to be, determined by a ratio of the feedback resistor $R_F$ to the input resistor $R_N$.

Figure 6:
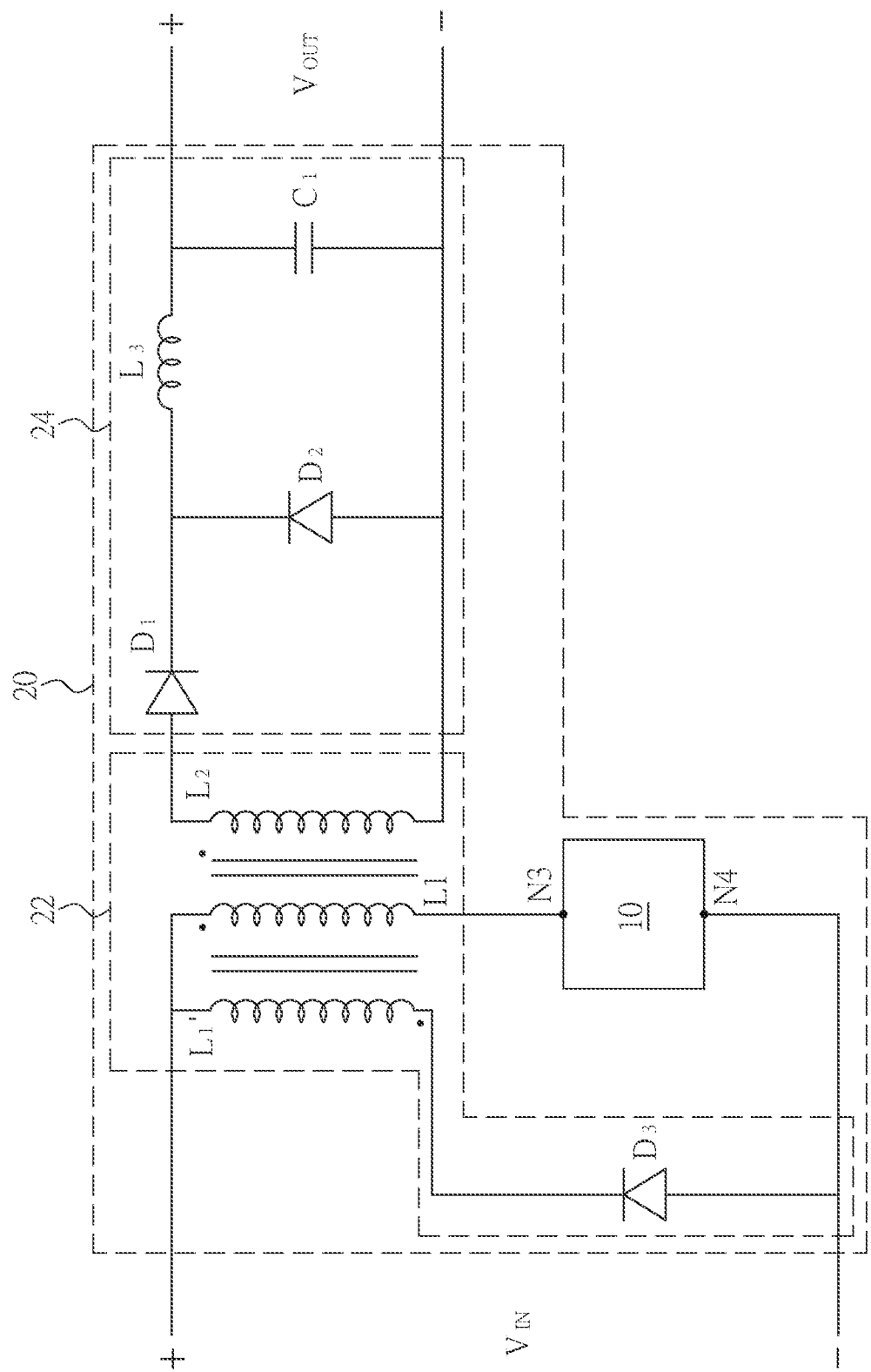
FIG. 6 illustrates a schematic function block diagram of a switch circuit applied in another power device according to some embodiments.

Referring to FIG. 1 and FIG. 6, FIG. 6 illustrates a schematic function block diagram of a switch circuit 10 applied in another power device 20. The power device 20 is a switching power supply having a forward converter. The switching power supply having a forward converter includes a transformer, an input circuit 22, an output circuit 24, and a switch circuit 10. The input circuit 22 includes at least one diode $D_3$ and a three-winding transformer. The three-winding transformer includes a first primary side coil $L_1$, a second primary side coil $L_1'$, and a secondary side coil $L_2$. The first primary side coil $L_1$ is electrically connected to the switch circuit 10, and the second primary side coil $L_1'$ is electrically connected to the diode $D_3$ which is connected to the fourth node N4. The output circuit 24 includes two diodes $D_1$ and $D_2$, an inductor $L_3$, and a capacitor $C_1$. An anode of the diode $D_1$ is electrically connected to one end of the secondary side coil $L_2$, and a cathode of the diode $D_1$ is electrically connected to a cathode of the diode $D_2$ and the inductor $L_3$. An anode of the diode $D_2$ is electrically connected to the other end of the secondary side coil $L_2$, and the diode $D_2$ is connected in parallel to series-connected the inductor $L_3$ and the capacitor $C_1$. The switch circuit 10 may be any of the foregoing embodiments, and is not described again.

Figure 7:
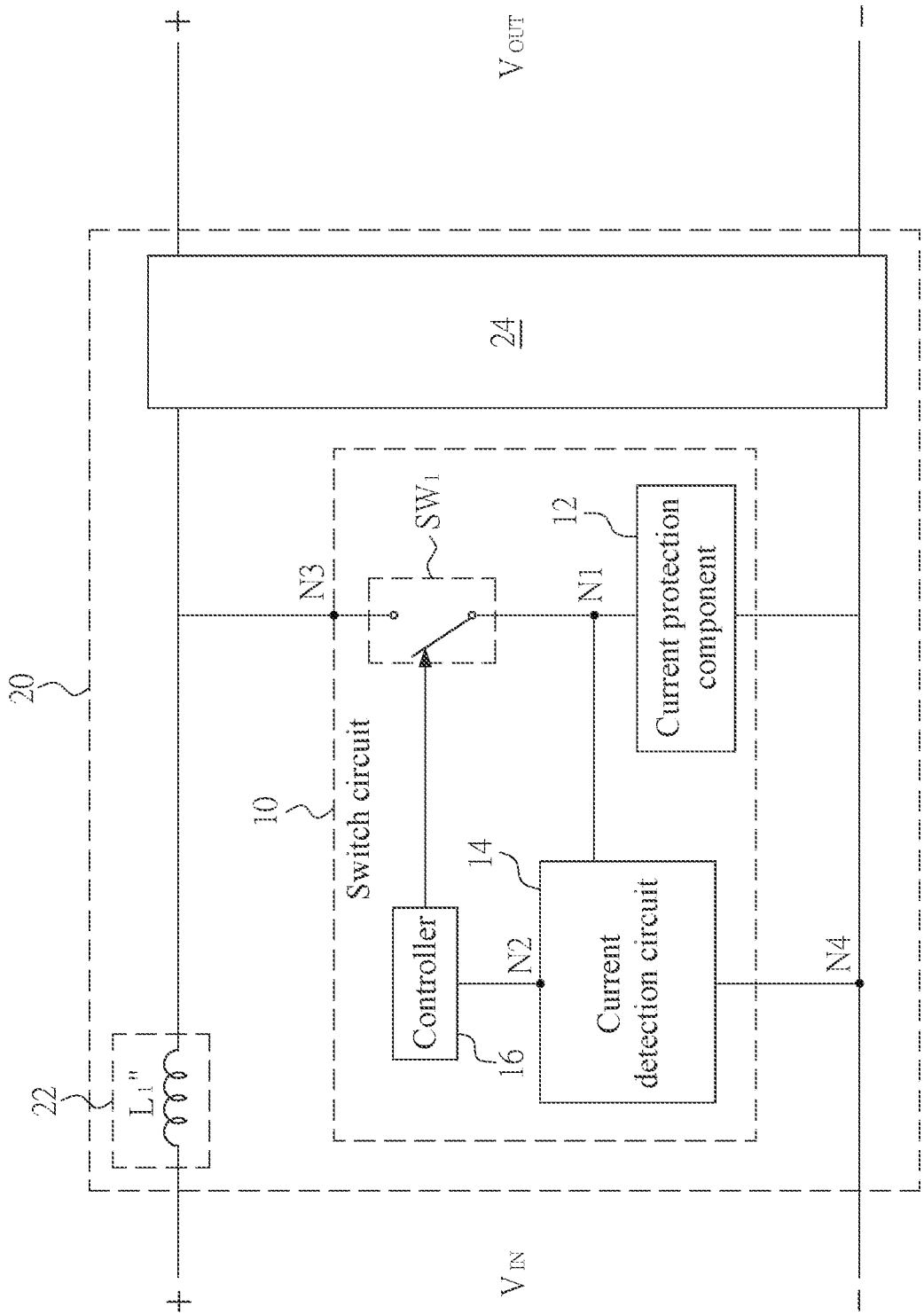
FIG. 7 illustrates a schematic function block diagram of a switch circuit applied in yet another power device according to some embodiments.

Referring to FIG. 7, FIG. 7 illustrates a schematic function block diagram of a switch circuit applied in yet another power device 20. The power device 20 is a switching power supply having a boost converter. The switching power supply having a boost converter includes an input circuit 22, an output circuit 24, and a switch circuit 10. The input circuit 22 includes a primary side coil. The primary side coil is, for example, but not limited to, an inductor $L_1''$. The inductor $L_1''$ is electrically connected to the switch circuit 10 at the third node N3 and the output circuit 24. The switch circuit 10 is connected in parallel to the output circuit 24. The output circuit 24 may be any of the foregoing embodiments, and is not described again. The switch circuit 10 may be any of the foregoing embodiments, and is not described again.

In some embodiment, the switch circuit 10 is suitable for a power device 20 having at least one primary side coil, and is capable of adjusting a current protection interval of the power device 20.

What is claimed is:

1. A switch circuit, suitable for a power device, wherein the power device comprises a primary side coil, and the switch circuit comprises:
    a first switch, configured to conduct and not conduct the primary side coil;
    a current protection component, generating, when the first switch conducts the primary side coil, a detection voltage corresponding to a current passing through the first switch;
    a current detection circuit, connected in parallel to the current protection component and outputting a protection voltage, wherein when the detection voltage is not greater than a first threshold, the current detection circuit generates a first voltage corresponding to the detection voltage as the protection voltage, and when the detection voltage is greater than the first threshold, the current detection circuit generates a second voltage corresponding to the detection voltage as the protection voltage, wherein the first voltage is different from the second voltage; and
    a controller, configured to control the first switch selectively to conduct or not to conduct, wherein when the protection voltage is greater than a second threshold, the controller does not increase a proportion of a conduction time to a non-conduction time of the first switch;
    when the detection voltage is not greater than the first threshold, the first voltage generated by the current detection circuit is the detection voltage;
    wherein the current detection circuit comprises:
    a first impedance, a second impedance and a second switch sequentially connected in series, one end of the first impedance is electrically connected to a first node connected to the first switch and the current protection component, the other end of the first impedance outputs the protection voltage, the second switch is conducting when the detection voltage is greater than the first threshold, and the second switch is not conducting when the detection voltage is not greater than the first threshold; and
    a comparison circuit, electrically connected to the current protection component and the second switch, comparing the detection voltage and a reference voltage, and outputting a comparison voltage, wherein the second switch is conducting when the comparison voltage is greater than the first threshold, and the second switch is not conducting when the comparison voltage is not greater than the first threshold.

2. The switch circuit according to claim 1, wherein the first switch and the second switch are semiconductor switches.

3. The switch circuit according to claim 2, wherein the first switch is a field effect transistor and the second switch is a bipolar transistor.

4. The switch circuit according to claim 1, wherein the current protection component is a resistor, a Hall component, or a current transformer.

5. The switch circuit according to claim 1, wherein the controller makes the first switch not conducting when the protection voltage is greater than the second threshold.

6. A switch circuit, suitable for a power device, wherein the power device comprises a primary side coil, and the switch circuit comprises:
    a first switch, configured to conduct and not conduct the primary side coil;
    a current protection component, generating, when the first switch conducts the primary side coil, a detection voltage corresponding to a current passing through the first switch;
    a current detection circuit, connected in parallel to the current protection component and outputting a protection voltage, wherein when the detection voltage is not greater than a first threshold, the current detection circuit generates a first voltage corresponding to the detection voltage as the protection voltage, and when the detection voltage is greater than the first threshold, the current detection circuit generates a second voltage corresponding to the detection voltage as the protection voltage, wherein the first voltage is different from the second voltage; and
    a controller, configured to control the first switch selectively to conduct or not to conduct, wherein when the protection voltage is greater than a second threshold, the controller does not increase a proportion of a conduction time to a non-conduction time of the first switch;

when the detection voltage is not greater than the first threshold, the first voltage generated by the current detection circuit is the detection voltage;

wherein the current detection circuit comprises:

a first impedance, a second impedance and a second switch sequentially connected in series, one end of the first impedance is electrically connected to a first node connected to the first switch and the current protection component, the other end of the first impedance outputs the protection voltage, the second switch is conducting when the detection voltage is greater than the first threshold, and the second switch is not conducting when the detection voltage is not greater than the first threshold; and a gain circuit, electrically connected to the current protection component and the second switch, wherein the gain circuit alters the detection voltage and outputs a gain voltage, the second switch is conducting when the gain voltage is greater than the first threshold, and the second switch is not conducting when the gain voltage is not greater than the first threshold.

7. The switch circuit according to claim 6, wherein the first switch and the second switch are semiconductor switches.

8. The switch circuit according to claim 7, wherein the first switch is a field effect transistor and the second switch is a bipolar transistor.

9. The switch circuit according to claim 6, wherein the current protection component is a resistor, a Hall component, or a current transformer.

10. The switch circuit according to claim 6, wherein the controller makes the first switch not conducting when the protection voltage is greater than the second threshold.

11. A switch circuit, suitable for a power device, wherein the power device comprises a primary side coil, and the switch circuit comprises:

a first switch, configured to conduct and not conduct the primary side coil;

a current protection component, generating, when the first switch conducts the primary side coil, a detection voltage corresponding to a current passing through the first switch;

a current detection circuit, connected in parallel to the current protection component and outputting a protection voltage, wherein when the detection voltage is not greater than a first threshold, the current detection circuit generates a first voltage corresponding to the detection voltage as the protection voltage, and when the detection voltage is greater than the first threshold, the current detection circuit generates a second voltage corresponding to the detection voltage as the protection voltage, wherein the first voltage is different from the second voltage; and a controller, configured to control the first switch selectively to conduct or not to conduct, wherein when the protection voltage is greater than a second threshold, the controller does not increase a proportion of a conduction time to a non-conduction time of the first switch;

wherein the current detection circuit comprises: a first impedance, a second impedance, and a second switch sequentially connected in series, and a third impedance connected in parallel to series-connected the second impedance and the second switch, wherein one end of the first impedance is electrically connected to a first node connecting the first switch with the current protection component, when the detection voltage is greater than the first threshold, the second switch is conducting, and the other end of the first impedance outputs the protection voltage, and when the detection voltage is not greater than the first threshold, the second switch is not conducting, and the other end of the first impedance outputs the protection voltage;

wherein the first impedance has a first end and a second end, the first end of the first impedance is electrically connected to the first node, the second end of the first impedance electrically connected to a second node;

the second impedance has a first end and a second end, the first end of the second impedance is electrically connected to the second node;

the third impedance has a first end and a second end, the first end of the third impedance is electrically connected to the second node; and the second switch has a control point and a gate point, the control point is electrically connected to the first node, and the gate point is electrically connected to the second end of the second impedance.

12. The switch circuit according to claim 11, wherein the first switch and the second switch are semiconductor switches.

13. The switch circuit according to claim 12, wherein the first switch is a field effect transistor and the second switch is a bipolar transistor.

14. The switch circuit according to claim 11, wherein the current protection component is a resistor, a Hall component, or a current transformer.

15. The switch circuit according to claim 11, wherein the controller makes the first switch not conducting when the protection voltage is greater than the second threshold.

* * * * *